United States Patent [19]

McConnell et al.

[11] Patent Number: 4,474,170
[45] Date of Patent: Oct. 2, 1984

[54] GLASS HEAT PIPE EVACUATED TUBE SOLAR COLLECTOR

[75] Inventors: Robert D. McConnell, Lakewood, Colo.; James H. Vansant, Tracy, Calif.

[73] Assignee: The United States of America as represented by the United States Department of Energy, Washington, D.C.

[21] Appl. No.: 290,282

[22] Filed: Aug. 6, 1981

[51] Int. Cl.³ .............................................. F24J 3/02
[52] U.S. Cl. .................... 126/433; 427/230; 427/234; 427/236; 427/181; 118/317
[58] Field of Search ............. 126/433, 901, 417; 165/104.26; 427/230, 234, 236, 181; 118/317

[56] References Cited

U.S. PATENT DOCUMENTS

| | | | |
|---|---|---|---|
| 2,623,809 | 12/1952 | Myers | 427/234 |
| 3,122,786 | 3/1964 | Huisman | 118/408 |
| 3,484,266 | 12/1969 | Nelson | 427/183 |
| 3,762,011 | 10/1973 | Staudhammer et al. | 165/104.26 |
| 4,067,315 | 1/1978 | Fehlner et al. | 126/433 |
| 4,335,709 | 6/1982 | Slaats | 126/433 |

FOREIGN PATENT DOCUMENTS

| | | | |
|---|---|---|---|
| 55-20317 | 2/1980 | Japan | 126/901 |
| 7704598 | 11/1977 | Netherlands | 126/433 |

*Primary Examiner*—Samuel Scott
*Assistant Examiner*—Noah Kamen
*Attorney, Agent, or Firm*—Kenneth L. Richardson; Jeannette M. Walder; Michael F. Esposito

[57] ABSTRACT

A glass heat pipe is adapted for use as a solar energy absorber in an evacuated tube solar collector and for transferring the absorbed solar energy to a working fluid medium or heat sink for storage or practical use. A capillary wick is formed of granular glass particles fused together by heat on the inside surface of the heat pipe with a water glass binder solution to enhance capillary drive distribution of the thermal transfer fluid in the heat pipe throughout the entire inside surface of the evaporator portion of the heat pipe. Selective coatings are used on the heat pipe surface to maximize solar absorption and minimize energy radiation, and the glass wick can alternatively be fabricated with granular particles of black glass or obsidian.

16 Claims, 8 Drawing Figures

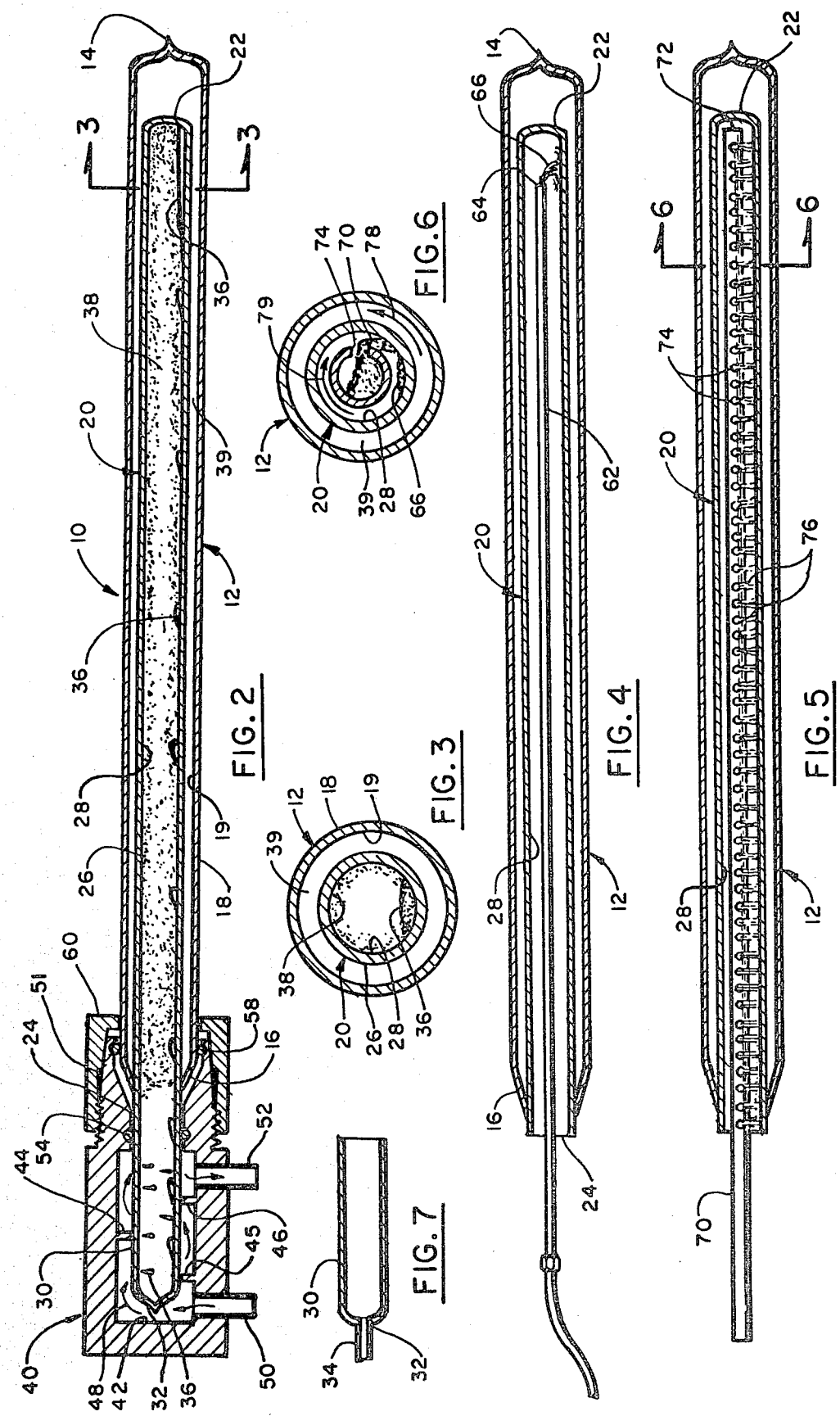

GLASS HEAT PIPE EVACUATED TUBE SOLAR COLLECTOR

The United States Government has rights in this invention pursuant to Contract No. EG-77-C-01-4042 between the U.S. Department of Energy and the Solar Energy Research Institute, a division of the Midwest Research Institute.

BACKGROUND OF THE INVENTION

1. Field of the Invention

This invention relates generally to solar collector apparatus, and more specifically to a glass heat pipe evacuated tube solar collector and method of fabricating same.

2. Description of the Prior Art

Most solar collectors used today have flat absorbing surfaces with one or more flat glass covers to retard heat loss from the absorbing surfaces. Although a selective coating having high absorption and low emissivity characteristics on the absorber surface also aids in minimizing heat losses, conventional flat solar collectors still lose significant thermal energy to the atmosphere due to convection and conduction in the air space adjacent the absorber surface. It is well known that evacuating the region between the absorber and the glass cover further reduces heat loss due to conduction and convection; however, the structure of the glass forming the vacuum chamber must be strong enough to withstand the atmospheric pressure on the external surface of the glass cover. Therefore, one of the most suitable geometric shapes for evacuated collectors is tubular because of the inherent strength of a tubular structure to withstand such external pressure, U.S. Pat. No. 980,505 issued in 1911 to W. Emmet illustrates such a concentric evacuated tube collector.

While the evacuated envelope around tubular solar radiation absorbers greatly minimizes conduction and convection losses, the vacuum will not reduce energy loss due to infrared radiation emitted from the heated absorber. However, selective coatings on the absorber surface, which have good absorption characteristics for solar energy but which emit or reradiate relatively little of the absorbed thermal energy, are well known and suitable for use in evacuated tube solar collector devices. In fact, conventional selective coatings in a vacuum do not have the degradation problems encountered with their use in flat plate solar collectors where they are exposed to the atmosphere and other working fluids.

Although evacuated tube solar collectors are not yet in general commercial use, significant developmental efforts have been made on them in the past several years. The principal developmental effort relating to evacuated tube solar collectors has been directed to methods and apparatus for removal of the thermal energy absorbed by the elongated glass tubes. One method of removing the thermal energy from the elongated inner glass tube of evacuated tube solar collectors is to circulate water or other working fluid into and out of the interior of the glass tube. The working fluid circulated through the glass tube absorbs the solar energy and carries it to a location where the energy can be stored or put to practical use. A number of patents illustrate this circulated working fluid absorber thermal energy removal technique, including: U.S. Pat. No. 980,505 issued to W. Emmet; U.S. Pat. No. 4,069,810 issued to H. Tabor; U.S. Pat. No. 4,018,215, issued to Y. Pei; U.S. Pat. No. 3,960,136, issued to K. Moan et al; U.S. Pat. No. 4,016,860, issued to K. Moan; U.S. Pat. No. 3,952,724, issued to Y. Pei; and U.S. Pat. No. 4,002,160, issued to G. Mather.

Another method of removing the thermal energy from the elongated inner glass tube of evacuated tube solar collectors is similar to those mentioned above, with the exception that the water or other working fluid is circulated through the elongated glass tube via pipes or circulation tubes positioned inside the glass tube so that the water or other working fluid does not actually come in contact with the glass tube. Examples of this method of thermal energy removal are shown in U.S. Pat. No. 4,080,954, issued to G. deWild, and German Pat. No. 2,612,171, issued to Philips.

Both of the design methods of solar energy removal from the glass tube absorber have the disadvantages of requiring pumps for circulating the working fluid through the elongated tube collectors thereby requiring additional energy consumption, excessive start-up time in the morning to heat the quantity of water necessary to function as a working fluid thereby reducing the effective working time of the collector panel, the working fluid in the collector is subject to freezing when the sun is not shining, and the working fluid in the tube is also capable of conducting thermal energy away from the object to be heated to the evacuated tube and radiating it to the exterior environment at night or during cold or cloudy weather thereby contributing to heat loss problems.

A third, relatively recent technique for removal of thermal energy absorbed by the elongated inner glass tube in evacuated tube solar collectors is to use heat pipes to transfer the absorbed solar energy to a working fluid medium that functions as a heat sink for storing the collected thermal energy or for transferring the energy to a location where it can be put to practical use. The evaporator portion of the heat pipe absorbs the solar energy, which causes a volatile thermal transfer fluid in the heat pipe (not the working fluid medium) to vaporize. The vapor pressure drives the vapor toward the cooler condenser section of the heat pipe, which is placed in contact with the working fluid medium or heat sink. The condenser portion of the heat pipe is where the thermal energy absorbed from the sun in the evaporator portion is conducted from the vapor of the thermal transfer fluid inside the heat pipe to the working fluid or heat sink outside the heat pipe. The lower temperature of the thermal transfer fluid vapor due to conduction of the heat from the vapor to the working fluid results in condensation of the thermal transfer fluid in the heat pipe. The condensed thermal transfer fluid then flows from the condenser portion back to the evaporator portion of the heat pipe where solar energy is absorbed to continue the cycle. An evacuated envelope is positioned around the evaporator portion of the heat pipe and a selective coating is placed on the exterior surface of the heat pipe to minimize convection, conduction, and radiation losses as described above. U.S. Pat. No. 4,059,093, issued to G. Knowles et al, is an example of a heat pipe evacuated tube solar collector.

The advantages of heat pipe collectors over the evacuated tube collectors utilizing other thermal energy removal techniques such as described above include, inter alia, the elimination of the risk of freezing liquid in the collectors, unidirectional heat flow from the absorber surface (the thermal diode effect), reduced pumping energy usage, lighter systems, and more rapid start-up or initial heat-up in the morning. However, the heat pipes utilized for solar collectors in the past have been metal heat pipes, such as that shown in the U.S. Pat. No. 4,059,093, issued to G. Knowles et al. In spite of the advantages mentioned above for heat pipe evacuated tube solar collectors, there are also a number of disadvantages associated with metal heat pipes in such applications that have not heretofore been solved. Some of the disadvantages include the requirement of maintaining a glass to metal vacuum seal to provide the transparent evacuated envelope around the evaporator portion of the heat pipe, the degradation problems associated with long term incompatibility of the metal with common working fluids, and expensive and only marginally effective wicks for the interior of the evaporator portion of the heat pipe. Effective vacuum sealing in a metal heat pipe is difficult and expensive to accomplish. The U.S. Pat. No. 4,082,575, issued to G. Eastman addresses some of the problems encountered in production of liquid compatible metals for heat pipes. Conventional mesh or grooved wicks in metal heat pipes leave much to be desired in efficient capillary drive of the thermal transfer fluids throughout the inside surface of the evaporator portions of the heat pipes due to only minimal surface contact between the wick and the surface of the heat pipe and nonoptimum porosity of commercially feasible wicks.

SUMMARY OF THE INVENTION

Accordingly, it is an object of the present invention to provide an evacuated tube solar collector with heat pipe thermal transfer means fabricated with the same transparent material as the evacuated envelope enclosure material to obtain effective vacuum seals.

It is also an object of the present invention to provide such an evacuated tube heat pipe solar collector with a material that is compatible with and not degraded by conventional working fluid mediums.

It is also an object of the present invention to provide an evacuated tube solar collector with the inside tube being an elongated glass tube heat pipe and the evacuated envelope enclosure also being an elongated glass tube of larger diameter than the heat pipe and positioned in surrounding relation to the evaporator portion of the heat pipe.

A further object of the present invention is to provide a glass heat pipe with an effective capillary wick on the inside surface thereof for enhancing capillary drive distribution of the thermal transfer fluid throughout the evaporator portion of the heat pipe.

A still further object of the present invention is to provide an effective and inexpensive method of fabricating a capillary wick on the interior surface of the evaporator portion of a glass heat pipe.

Still another object of the present invention is to provide an inexpensive method of fabricating an evacuated tube solar collector with a glass heat pipe for absorbing the solar energy and transferring the solar energy to a working fluid medium.

In accordance with the invention, a solar collector apparatus is provided which includes a heat pipe absorber for absorbing solar radiant energy and for transferring the absorbed energy to a working fluid, a selective coating on the exterior surface of the evaporator portion of the heat pipe, and an evacuated transparent envelope structure surrounding the evaporator portion of the heat pipe. A capillary wick in the form of a layer of granulated glass particles is adhered to the inside surface of the evaporator portion of the heat pipe for enhancing capillary drive distribution of the heat transfer fluid over the inside surface of the evaporator portion.

The invention further includes a method of fabricating an all glass evacuated tube heat pipe solar collector, including a method of fabricating an inexpensive, effective capillary wick on the inside surface of the glass heat pipe evaporator. The method includes placing an elongated glass heat pipe evaporator tube having one end closed and a selective coating on its exterior surface concentrically inside a larger diameter glass enclosure tube, evacuating the space in the larger glass enclosure tube, and sealing the enclosure tube around the evaporator tube to form a vacuum tight seal. The evaporator tube will function as the solar energy absorber as well as the evaporator portion of the heat pipe. The inside surface of the evacuator tube is then wetted with a water glass solution, the granulated glass particles are deposited in a thin layer uniformly over the wetted inside surface of the heat pipe, and the heat pipe is then fired to fuse the glass particles of sodium silicate in the water glass solution to the glass tube. The heat pipe tube is then evacuated, the heat transfer fluid is poured into the tube, and it is sealed with a vacuum tight seal. The closure on the end of the heat pipe tube is preferably in the form of an elongated tube piece that is fused to the heat pipe tube, and this extension can serve advantageously as the condenser portion of the heat pipe.

Alternative embodiments of the invention include using granulated particles of black glass or obsidian for forming the capillary which in combination with a selective coating that transmits visible solar radiation through the tube to the black wick, but which minimizes infrared radiation emitted by the outer surface of the heat pipe tube. The heat pipe tube can also be sealed with a metal end cap which can also serve as the condenser portion. However, such an embodiment does not evade the sealing problems with a glass to metal seal resulting from the differential coefficients of expansion of the two materials.

BRIEF DESCRIPTION OF THE DRAWINGS

The novel features which are believed characteristic of the present invention are set forth in the appended claims. The invention itself, however, together with further objects and attendant advantages thereof, will become apparent and best understood by reference to the following detailed description taken in connection with the accompanying drawings, setting forth by way of illustration and example certain embodiments of the invention in the several figures of which like reference numerals identify like elements, and in which:

FIG. 2 is a longitudinal cross-sectional view of the evacuated tube glass heat pipe solar collector of the present invention shown with the condenser portion thereof mounted in a heat exchanger manifold where the absorbed solar energy is transferred to a heat sink or working fluid medium;

FIG. 3 is a cross-sectional view of the glass heat pipe collector taken along lines 3—3 of FIG. 2;

FIG. 4 is a cross-sectional view of the glass tubes of the heat pipe with a pipette positioned therein for distributing water glass on the interior thereof;

FIG. 5 is a cross-sectional view of the glass tubes of the heat pipe with an elongated tube container for distributing the granulated glass powder on the interior thereof to form a wick;

FIG. 6 is a cross-sectional view of the glass tubes taken along line 6—6 of FIG. 5;

FIG. 7 is a cross-sectional view of the condenser end cap portion of the tube prior to being fused onto the main portion of the glass tube.

DETAILED DESCRIPTION OF THE PREFERRED EMBODIMENTS

Figure 1:
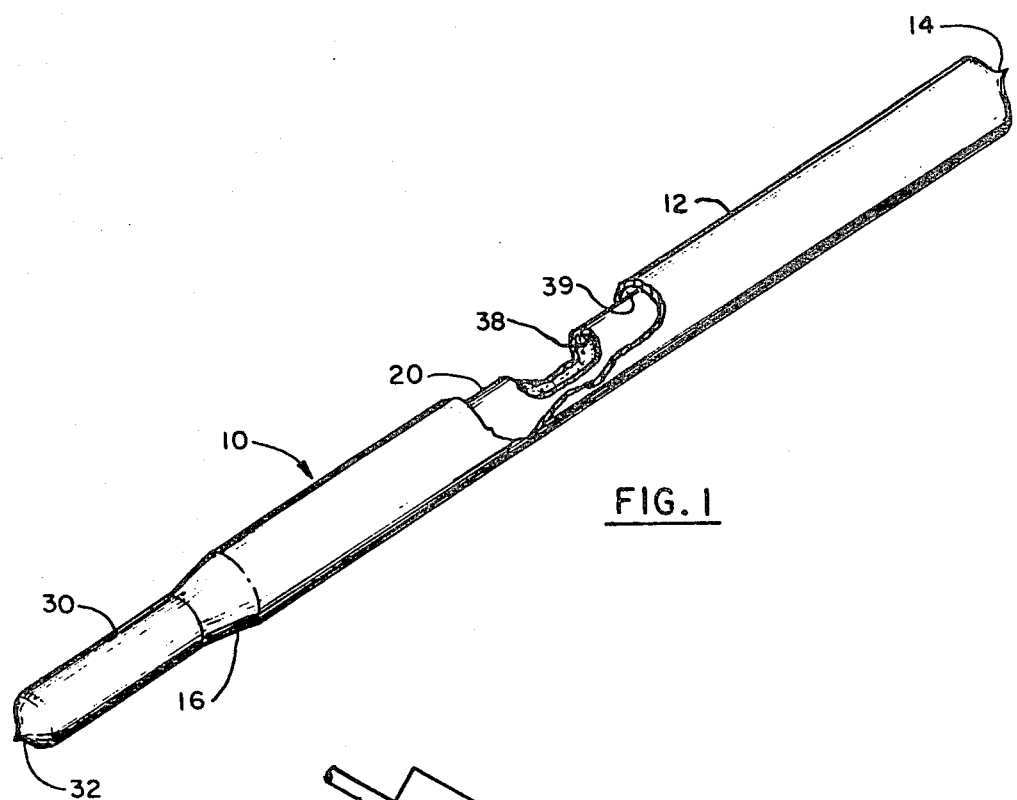
FIG. 1 is a perspective view of the evacuated tube glass heat pipe solar collector of the present invention with portions of the tubes cut away to illustrate the construction thereof.

The evacuated tube glass heat pipe solar collector 10 of the present invention is shown in FIG. 1. Essentially, it is comprised of two elongated glass tubes 12, 20 with the smaller diameter glass tube 20 positioned inside the larger diameter glass tube 12 in concentric relation thereto. The outer glass tube 12 has a diameter 18 sufficiently large to leave an annular space 39 inside the outer glass tube 12 between the outer glass tube 12 and the inner glass tube 20. The inner tube 20 is sealed at both ends and has a capillary wick 38 formed on its inside surface. The outer tube 12 is swaged at one end 16 to the diameter of the smaller glass tube 20 and is sealed to the peripheral surface of the smaller glass tube by fusing, and the distal end 14 of the larger glass tube 12 is closed and sealed to the exterior environment. As will be described in more detail below, the inside tube 20 is also evacuated and a small amount of thermal transfer fluid, such as water, ammonia, methanol, ethanol, or other suitable volatile fluid is placed on the inside of the evacuated inside glass tube 20 before it is sealed.

Referring now to FIGS. 2 and 3, the glass heat pipe solar collector 10 of the present invention is shown in an operable embodiment in combination with a heat exchanger 40. As described above, the outer cylindrical glass tube 12 is positioned concentrically over the inner cylindrical glass tube 20 with an annular space between the tubes. A space is also left between the distal end 22 of the inner glass tube 20 and the distal end 14 of the outer glass tube 12. For long tube structures a support (not shown) might be required at the distal end 22 of the inner tube 20. The other end 16 of the outer glass tube 12 is swaged onto the exterior peripheral surface of the inner glass tube 20 and fused thereto. The space 39 between the glass tubes 12, 20 is preferably a vacuum to minimize thermal loss by conduction and convection, as will be discussed in more detail below. The capillary wick 38 on the inside surface 28 of the evaporator portion of the inner glass tube 20 is preferably formed by a layer of granular glass particles or beads, as will also be described in more detail below. The interior of the inner glass tube 20 is also evacuated, and a small quantity of the thermal transfer fluid 36 is placed therein. The condenser end 30 of the glass tube 20 is positioned in a heat exchanger 40. The heat exchanger 40 includes an interior chamber 42, which forms a water jacket heat sink around the condenser end 30 of the heat pipe solar collector 10. A plurality of baffles 44, 45, 46 are positioned in the water jacket chamber 42 to increase the distance travelled by the water in the water jacket chamber and to uniformly distribute the flow of water about the peripheral surface of the condenser portion 30 for efficient heat transfer from the heat pipe to the water. As shown by the flow arrow 48 in FIG. 2, the water or other working fluid flows into the water jacket chamber 42 via inlet pipe 50 and circulates around the condenser portion 30 and out the outlet pipe 52. The heated water flowing from outlet 52 of course can be used for conventional heating applications. In high temperature applications, the water will be turned to steam.

The heat pipe collector 10 can be secured to the heat exchanger 40 by any suitable means that seals the interior water jacket chamber 42 from the exterior environment. The attachment shown in FIG. 2 includes an elongated sleeve 51 protruding outwardly from the heat exchanger around the periphery of the heat pipe collector 10 with an inner O-ring 54 anchored therein and tightly fitted around the peripheral surface of the condenser portion 30. The inner O-ring 54 seals the water chamber 42 from the exterior to prevent leakage. An outer O-ring 58 is positioned near the opening of the sleeve 51 to seal against and support the outer tube 12 of the heat pipe 10. A nut 60 with an interior tapered surface is tightened onto the sleeve 51 to constrict the O-ring 58 around the periphery of the outer tube 12. If the water pressure in the heat exchanger is very high, some additional support might be required to anchor the condenser in the heat exchanger. The heat exchanger is either fabricated from insulating materials such as polyethylene pipe or is insulated by an outer insulating wrap.

In order to minimize reradiation of absorbed energy by the heat pipe collector 10, it is preferred that a selective coating is placed on the exterior surface 26 of the evaporator portion of the inner glass tube 20 to enhance absorption of solar energy while minimizing radiation of the absorbed energy. A transparent selective coating could also be placed on the interior surface of the outer tube 12.

In operation, solar energy impinges on the heat pipe collector 10. The solar energy, which is primarily in the form of visible light, is transmitted through the outer glass tube 12 to be absorbed by the inner glass tube 20, such absorption being enhanced by the selective coating on the surface 26 as described above. The energy then causes the thermal transfer fluid 36 in the heat pipe to evaporate so that the vapors are driven in the manner of a conventional heat pipe to a lower pressure area in the condenser portion 30 of the inner glass tube 20. The water in the chamber 42 provides a cooler environment around the condenser portion 30 and absorbs heat from the vapor in the condenser 30. Consequently, the vapor in the condenser 30 condenses into liquid form, as illustrated by the droplets 36 in FIG. 2. When the heat pipe collector 10 is properly positioned with the distal end 22 of the inner tube 20 in a position somewhat lower than the condenser end 30, the condensed liquid 36 flows back into the evaporator portion of the inner tube 20 where solar energy is absorbed. The wick 38 on the interior surface 28 of the evaporator portion of the inner glass tube 20 creates an environment in which a strong capillary action draws the fluid 36 in the evaporator portion circumferentially around the interior surface 28 of the glass tube 20. This capillary action results in a uniform distribution of the thermal transfer fluid 36 throughout the interior surface 28 of the tube 20 for a maximum heat absorption by the fluid and for efficient vaporization throughout the evaporator portion of the glass tube 20.

In addition to the energy saving contribution of the selective coating on the surface 26 to minimize reradiation of the absorbed energy, the vacuum in the annular space 39 between the outer and inner tubes 12, 20, respectively, minimizes heat losses due to convection and conduction. Therefore, the evacuated tube glass heat pipe solar collector 10 of the present invention is a highly efficient solar energy absorber, and it efficiently transfers the absorbed heat with minimal loss to a working fluid medium such as the water flowing through water jacket 42 in the heat exchanger 40.

Figure 8:
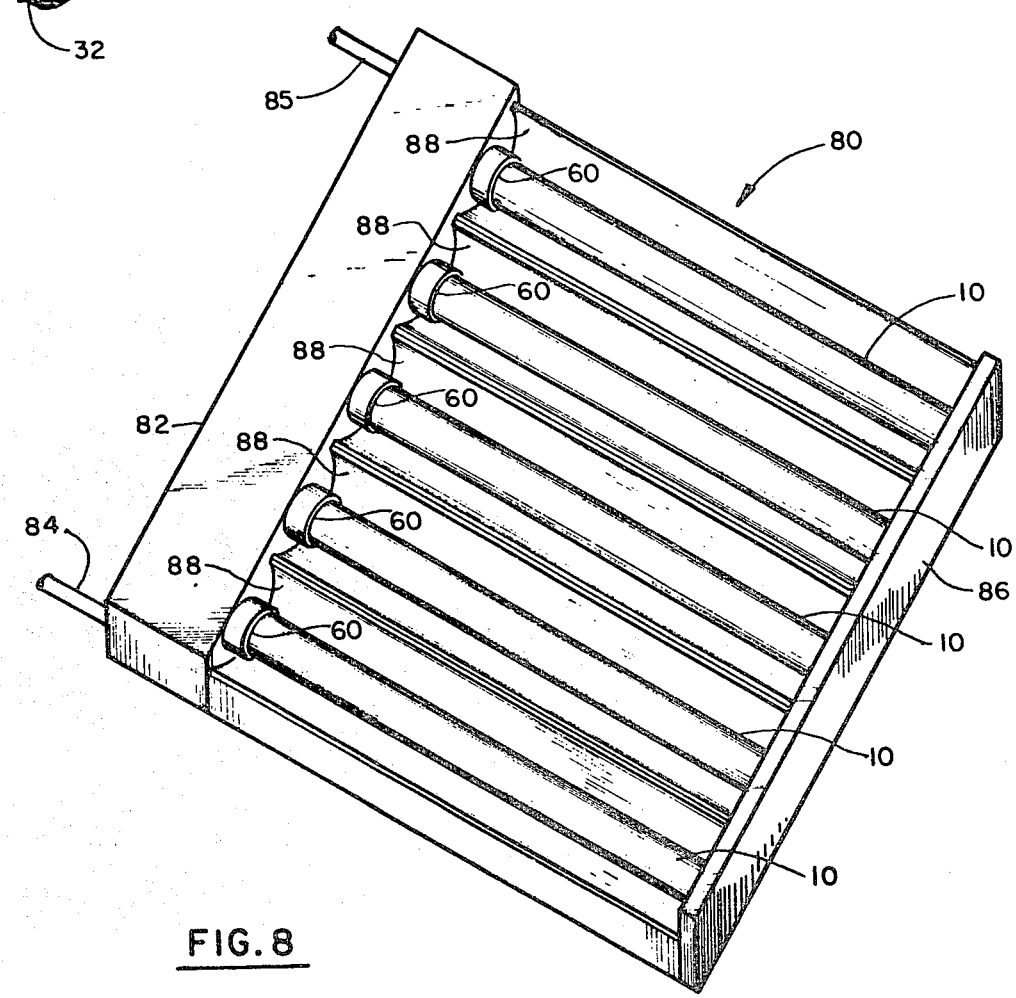
FIG. 8 illustrates a solar collector panel comprised of a plurality of glass heat pipe tube collectors mounted in a common heat exchanger manifold.

The illustration in FIG. 8 shows an application of utilizing a plurality of evacuated tube glass heat pipe solar collectors 10 of the present invention attached to a common heat exchanger 82 to form a solar collector panel 80 that covers a larger surface area. In this application, individual parabolic reflectors 88 are preferably positioned under the heat pipe collectors 10 to maximize collection of solar energy by reflecting the solar radiation impinging between the heat pipe collector tubes 10 toward the collectors 10 for absorption therein. In this application, the end plate 86 serves as an additional support for the distal ends of the heat pipe collectors 10. Although not shown, the heat exchanger 82 includes appropriate baffles and chambers to maximize heat transfer from the heat transfer fluid vapor 36 in the condenser portion 30 of the heat pipe collectors 10. Inlet and outlet tubes 84, 85 connected to the heat exchanger 82 are shown in FIG. 8 for conducting the working fluid medium into and out of heat exchanger 82.

As an alternative to the combination of the capillary wick 38 and selective absorption coating on the surface 26 of the inner glass tube 20 as described above, the evaporation portion of the tube 20 can also be made with a capillary wick formed with a thin layer of black glass particles or obsidian. In this alternative embodiment, the layer of black glass particles on the interior surface of the inner glass tube 20 functions both as a capillary wick for the heat transfer fluid 36 and as the solar energy absorber. In this alternate embodiment, the selective coating on the surface 26 is a material that transmits the visible light radiation while reflecting infrared radiation. In this manner, the solar energy in the form of visible light is transmitted through both the outer and inner glass tubes 12, 20 respectively, and absorbed by the wick layer of black glass particles. However, heat energy in the form of infrared radiation is reflected back and trapped inside the inner glass tube 20. In all other respects, the heat pipe solar collector of this alternate embodiment functions the same as the preferred embodiment described above.

As another alternative, the heat collector 10 can also be fabricated with a metal condenser portion. However, it is more difficult and more expensive to provide a connection of a metal condenser portion to the glass tube in a manner that is capable of maintaining a permanent vacuum in the inside tube, particularly where the respective coefficients of expansion of the metal used and the glass are significantly different.

A significant feature of this invention is the method of forming the evacuated tube glass heat pipe solar collector with the porous glass wick lining 38 in the evaporator portion of the inner glass tube 20. As shown in FIG. 4, the collector 10 is initially fabricated by inserting the smaller tube 20 inside the larger tube 12 and then fusing the swaged end 16 of the larger tube 12 to the peripheral surface of the smaller tube 20 to form a seal. A vacuum is then drawn in the large tube through the distal end 14 and sealed at the distal end 14 to result in a permanent vacuum in the annular space between the larger tube 12 and the smaller tube 20. An elongated hollow pipette 62 is then inserted into the open end 24 of the smaller tube 20 to the closed end 22. The water glass solution 66 is then pumped through the pipette 62 so that it is disbursed from the open end 64 of the pipette 62 into the interior of the glass tube 20. As the pipette 62 is slowly withdrawn from the glass tube 20 while disbursing water glass 66 therein, the assembly of the glass tubes 12, 20 can be rotated to evenly distribute the water glass solution 66 in a uniform film throughout the interior surface of the glass tube 20.

Referring now to FIGS. 5 and 6, an elongated cylindrical tube 70 filled with granular glass particles 76 is inserted into the open end 24 of glass tube 20 until the end 72 of container tube 70 is adjacent to the closed end 22 of the glass tube 20. Then, as the assembly of the glass tubes 12, 20 is rotated in the direction of the arrow 78 in FIG. 6, the container tube 70 is rotated the opposite direction as shown by the arrow 79 in FIG. 6 so that its contents of granular glass particles 76 are poured out of holes 74 onto the interior surface 28 of glass tube 20 which is wetted with the water glass 66. In this manner, the granulate glass particles 76 adher to the inside surface 28 of glass tube 20 in a uniformly distributed thin layer to form the capillary wick. When the entire inside surface 28 of the evaporator portion of tube 20 is coated with the thin layer of granular glass particles 76, the container tube 70 is withdrawn and the glass tube assembly is placed in an oven and fired to harden the water glass solution and permanently fuse the glass particles 76 together on the interior surface of the inside glass tube 20 to form the capillary wick 38.

After the water glass 66 and layer of glass granules 76 has been fired to set the capillary wick 38, a cylindrical glass condenser end 30 of the same diameter as the inside glass 20 is fused onto the open end 24 of the inside tube 20. The heat transfer fluid 36 is then placed inside the glass tube 20 through the open end tube 34 in end 32 of condenser portion 30, a vacuum is drawn through the tube 34, and end 32 is then sealed by heating and closing tube 34.

It has been found that a water glass solution of approximately 25% sodium silicate and 75% water by weight provides a water glass solution of satisfactory viscosity to coat and maintain a film on the inside surface of the tube 20 and to adhere the glass particles to the inside surface 28 of the tube 20 until firing. Other means for adhering the glass granules 76 to the interior surface 28 of glass tube 20 can also be used. For example, a viscous glass slurry of an inert carrier medium with very fine powdered (30 microns in diameter) glass mixed and suspended therein could also be used to coat the inside surface 28 of glass tube 20 to hold the glass granules 76 until firing. It has also been found that glass particles ranging from about 470 to 270 microns in diameter are suitable for this fabrication process as well as for good capillary drive action when the wick is used in the glass tube heat pipe.

The method described above of an elongated container tube with a plurality of holes therein along its longitudinal surface for distributing the glass granules evenly throughout the length of the glass tube 20 is satisfactory; however, for production line techniques, a more continuous and less labor intensive apparatus is preferable for uniformly distributing the glass granules 76 throughout the interior of the tube 20. For example, a small tube conveyor with an auger therein can be used to continuously convey the glass granules 76 to the interior of tube 20 while the auger is slowly rotated and withdrawn. Also, the glass granules can be conveyed into the interior of the glass tube 20 and applied to the surface by air pressure or in a liquid conveying medium.

As mentioned above, there are a number of heat transfer fluids that can be used satisfactorily, including water, ammonia, methanol, ethanol, and other commercially available heat transfer fluids for heat pipes. For low temperature uses, a fluid with a higher vapor pressure, such as methanol, is preferred, and for higher temperatures water can be used. The heat pipe solar collector of this invention is particularly suited for high temperature applications such as positioning in a large parabolic reflector for generating extremely hot water or steam. In such applications, a heat transfer fluid such as "Dowtherm A", manufactured by Dow Chemical Company, is preferred because of its high boiling point and satisfactory effervescent properties.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein but may be modified within the scope of the appended claims.

What we claim is:

1. Solar apparatus comprising:
    a heat pipe absorber for absorbing incident solar radiation and for transferring thermal energy derived therefrom to a working fluid, said heat pipe absorber including an elongated glass tube with a hollow interior sealed from the exterior environment, a first portion of said glass tube being transparent and adapted for exposure to said solar radiation and a second portion of said glass tube being adapted for exposure to the working fluid;
    a heat transfer fluid in said transparent tube for transferring said thermal energy from said first portion to said working fluid, said heat transfer fluid being a volatile liquid adapted to evaporate readily upon conducting said thermal energy and to condense to a liquid when in the environment of the working fluid;
    selective coating means on the outside surface of said first portion, said selective coating means being adapted to maximize said absorption of said solar radiation on said outside surface of said first portion and to minimize the emission of said absorbed thermal energy;
    transparent envelope means surrounding said first portion in space relation thereto, the space between said first portion and said envelope being evacuated and hermetically sealed from the exterior environment; and
    porous wick means for uniformly distributing said heat transfer fluid throughout said inside surface of said first portion, said wick means comprising a layer of glass particles and a layer of sodium silicate derived from a water glass solution previously heated to remove said water for bonding said glass particles to said inside surface of said first portion, said layer of glass particles being in intimate and uniform contact with said inside surface of said first portion, said layer of glass particles being fused together and being permanently fused to said inside surface of said first portion through said layer of sodium silicate, said glass particles being previously heated in a manner to cause said glass particles to be said fused together and be fused to said inside surface of said first portion through said layer of sodium silicate.

2. The solar collector apparatus of claim 1, wherein said glass particles are of sizes in the range of about 470 to 270 microns in diameter.

3. The solar collector apparatus of claim 2, wherein said glass particles are transparent, and said selective coating means is a dark colored film on the outside surface of said first portion, said film being adapted to absorb solar radiation and to emit only a minimum of infrared radiation.

4. Heat pipe apparatus comprising:
    a transparent envelope means;
    an elongated glass tube within said envelope means, said glass tube having a hollow interior sealed from the exterior environment, said glass tube including inner and outer opposed surface portions, said outer portion of said glass tube being adapted for exposure to a source of thermal energy and for absorbing said thermal energy from said source, and said inner portion of said glass tube being adapted for exposure to a heat sink cooler than said source of thermal enery and for transferring said thermal energy to said heat sink through thermal conduction;
    a heat transfer fluid in said glass tube which is volatile and adapted to vaporize upon conducting said thermal energy and to condense to the heat sink;
    a porous wick means on the inside surface of said glass tube for enhancing capillary drive distribution of said heat transfer fluid over the inside surface of said glass tube, said wick means including a layer of granulated glass particles, said layer of glass particles being in intimate and uniform contact with said inside surface of said glass tube, said glass particles being previously heated in a manner to bond said glass particles together and to cause said bonded glass particles to be permanently adhered to the inside surface of said glass tube; and
    a film means for uniformly and permanently said adhering the bonded glass particles to said inside surface of said glass tube, said film means comprising a sodium silicate residue derived from a previously heated water glass solution, said film means enabling said thermal energy absorbed at said outer portion to be uniformly conducted therethrough to said wick means.

5. The heat pipe apparatus of claim 4, wherein said glass particles are of sizes in the range of about 470 to 270 microns in diameter.

6. In an evacuated tube insulated solar collector apparatus including solar energy absorber means surrounded by an evacuated, hermetically sealed transparent envelope in spaced-apart distance thereto, the improvement comprising;
    a solar energy absorber in the form of an elongated glass heat pipe, a first portion of which is positioned in said envelope and adapted to absorb solar radiation and a second portion of which extends outside said envelope and is adapted for exposure to a heat sink working fluid;

a heat transfer fluid in said glass heat pipe for transferring said thermal energy said absorbed by said first portion to said heat sinking fluid, said heat transfer fluid being a volatile liquid adapted to evaporate readily upon conduction of said thermal energy and to condense to a liquid when in the environment of said heat sinking fluid;

selective coating means outside said first portion of said heat pipe, said selective coating means being adapted for maximizing said absorption of solar radiation by said first portion of said heat pipe and minimizing emission of said absorbed thermal energy;

a porous wick means on the inside surface of said first portion for enhancing capillary drive distribution of said heat transfer fluid over the inside surface of said first portion, said wick means including a layer of granulated glass particles, said layer of glass particles being in intimate and uniform contact with said inside surface of said first portion, said glass particles being previously heated in a manner to bond said glass particles together and to cause said bonded glass particles to be permanently adhered to the inside surface of said glass tube; and a film means for enabling said wick means to be said intimately and uniformly adhered to said inside surface of said first portion, said film means comprising a sodium silicate residue derived from a previously heated water glass solution, said film means further enabling said thermal energy to be uniformly conducted from said selective coating of said heat transfer fluid.

7. The heat pipe apparatus of claim 5, wherein said solution includes approximately 25% sodium silicate and 75% water by weight.

8. A method of fabricating a capillary wick on an inside surface of a glass heat pipe, comprising the steps of:

preparing a thermally conducting bonding medium consisting of a water glass solution of a sufficient viscosity to maintain a film on said inside surface of said glass heat pipe and to allow said capillary wick to uniformly and permanently adhere to said inside surface after depositing said wick thereon;

depositing said glass solution on said inside surface of said glass heat pipe while simultaneously rotating said glass heat pipe so as to form said film and to enable said solution to be evenly distributed on said inside surface;

rotating a conveying means in a first direction while simultaneously conveying a glass powder on said film formed on said inside surface of said glass pipe to effect forming said wick;

rotating said glass pipe in a second opposite direction while said glass powder is being conveyed on said inside surface while forming said wick;

adapting said film and said wick to conduct thermal energy from an outside surface of said glass heat pipe by fusing said glass powder together and to said inside surface with said film such that said fused glass powder has sufficient porosity and capillary characteristics for glass heat pipe applications;

firing said heat pipe to accomplish said fusing of said glass powder together and to said inside surface through said film;

cooling said heat pipe to normal temperature; and depositing an absorption-type selective coating on an exterior surface of said glass heat pipe for maximizing an absorption of incident sun radiation.

9. The method of claim 8, including the step of firing the heat pipe by slowly raising the temperature to approximately 300° C. and maintaining that temperature for about three hours.

10. The method of claim 8, wherein said water glass solution comprises approximately 25% sodium silicate and 75% water by weight.

11. The method of claim 8, wherein said glass powder comprises granulated glass particles sized in a range of from about 470 to about 270 microns in diameter.

12. A method of fabricating a glass heat pipe solar collector, comprising the steps of:

placing an elongated glass heat pipe evaporator tube having one closed end and an absorption-type solar selective coating on its exterior surface concentrically inside a large diameter glass enclosure tube leaving a space around said evaporator tube inside said enclosure tube and leaving the open end of said evaporator tube extending outwardly from said enclosed tube;

swaging the one end of said enclosure tube adjacent to said open end of said evaporator tube and fusing said one end of said enclosure to an exterior of said evaporator tube to form a vacuum-type seal;

evacuating the space inside the enclosure tube and sealing its outer end in a vacuum tight seal to maintain a vacuum around said evaporator tube;

preparing a thermally conducting binding medium consisting of a water glass solution of a sufficient viscosity to maintain a film on said inside surface of said glass heat pipe and to allow a capillary wick defined by the glass heat pipe to uniformly and permanently adhere to said inside surface upon depositing said film and aid wick thereon;

depositing said said solution on said inside surface of said glass heat pipe while simultaneously rotating said glass heat pipe so as to enable said solution to be evenly distributed in a uniform film throughout said inside surface;

rotating a conveying means in a first direction while conveying glass particles on said surface of said glass pipe with said conveying means, while simultaneously rotating said glass tube in a second opposite direction so as to effect uniformly forming said wick on said inside surface;

adapting said film and said wick to thermally conduct heat energy from said selective coating by fusing said glass particles together and to said inside surface with said film such that said fused glass powder has sufficient porosity and capillary characteristics for glass heat pipe solar collector applications;

firing the evaporator and vacuum envelope assembly to accomplish fusing said glass powder together and to said inside surface of said heat pipe through said film;

fusing a cap member having an opening in an end thereof over the open end of the evaporator tube to form a condenser portion and to complete the structure of the heat pipe comprised of the evaporator portion inside the evacuated envelope of the condenser portion outside the evacuated envelope;

placing a thermal transfer fluid into the evaporator portion through the opening in the cap member; and evacuating the inside of the heat pipe and sealing the opening in the cap member to maintain said transfer fluid in the heat pipe.

13. The method of claim 12, wherein said water glass solution consists of approximately 25% sodium silicate and 75% water by weight.

14. The method of claim 12, wherein said glass particles are sized in a range of from about 470 to about 270 microns in diameter.

15. The method of claim 12, wherein said binding medium is a viscous slurry of fine powdered glass mixed and suspended in an inert carrier medium.

16. Solar collector apparatus comprising:
a heat pipe absorber for absorbing incident solar radiation and for transferring thermal energy derived therefrom to a working fluid, said heat pipe absorber including an elongated glass tube with a hollow interior sealed from the exterior environment, a first portion of said glass tube being transparent and adapted for exposure to said solar radiation and a second portion of said glass tube being adapted for exposure to the working fluid;
a heat transfer fluid in said transparent tube for transferring said thermal energy from said first portion to said working fluid upon conducting said thermal energy;
selective coating means on the outside surface of said first portion, said selective coating means being adapted to maximize said absorption of said solar radiation on said outside surface of said first portion; and
a porous wick means for uniformly distributing said heat transfer fluid throughout said inside surface of said first portion, said wick means comprising a layer of glass particles and a layer of sodium silicate derived from a water glass solution previously heated to remove said water for bonding said glass particles to said inside surface of said first portion, said layer of glass particles being in intimate and uniform contact with said inside surface of said first portion, said layer of glass particles being fused together and being permanently fused to said inside surface of said first portion through said layer of sodium silicate, said glass particles being previously heated in a manner to cause said glass particles to be said fused together and be fused to said inside surface of said first portion through said layer of sodium silicate.

* * * * *